July 13, 1965 P. H. WENDT 3,193,900
APPARATUS FOR MANUFACTURING CLAY PIPE
Filed Sept. 30, 1963 2 Sheets-Sheet 2

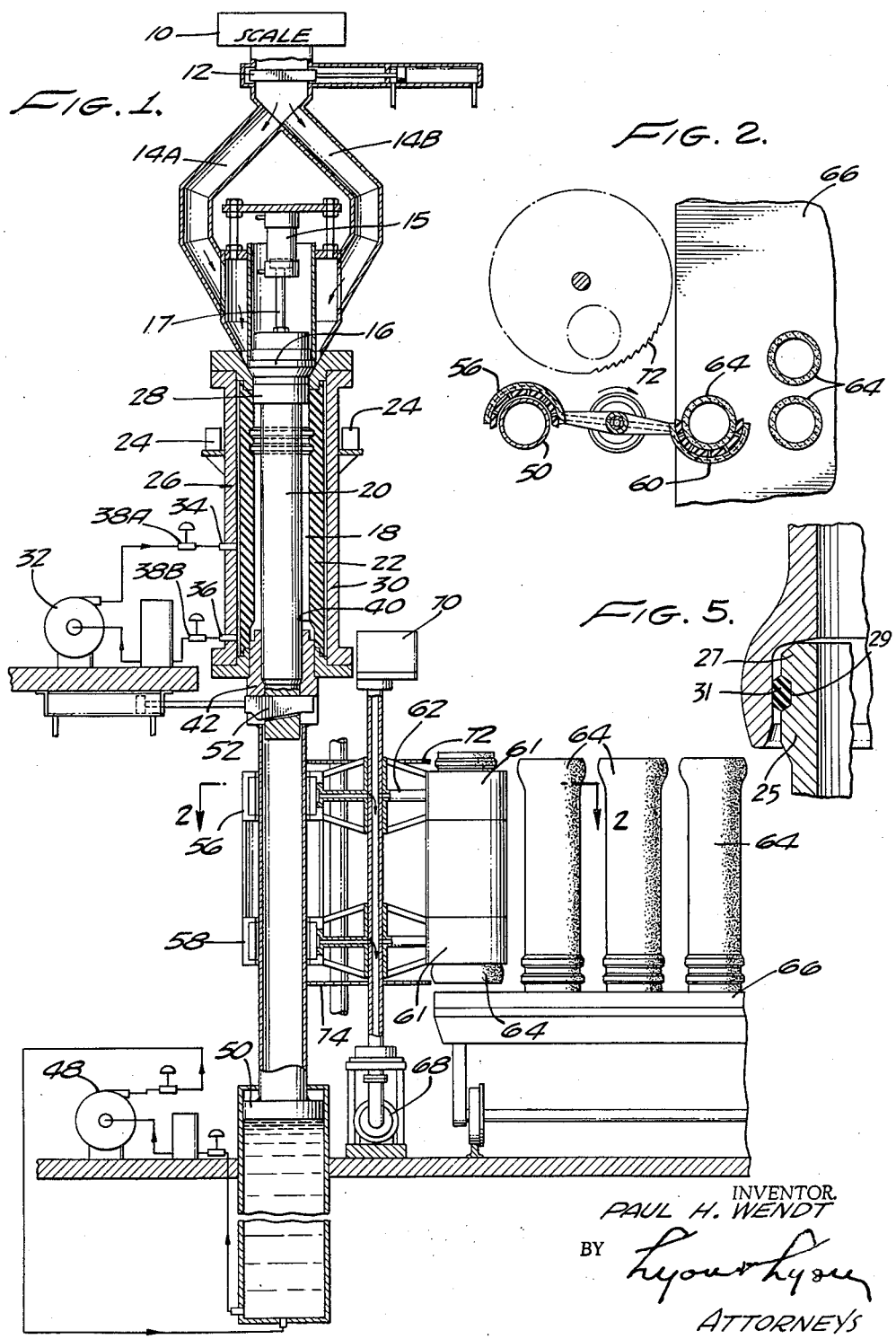

INVENTOR.
PAUL H. WENDT
BY Lyon & Lyon
ATTORNEYS

United States Patent Office
3,193,900
Patented July 13, 1965

3,193,900
APPARATUS FOR MANUFACTURING
CLAY PIPE
Paul H. Wendt, Arcadia, Calif., assignor to Pacific Clay Products, Los Angeles, Calif., a corporation of California
Filed Sept. 30, 1963, Ser. No. 312,426
3 Claims. (Cl. 25—31)

This invention relates to the manufacture of vitrified clay pipe and, more particularly, to improvements therein.

This application is a continuation-in-part of my pending application, Serial No. 202,480, filed June 14, 1962.

In the present method of manufacturing vitrified clay pipe, the clay is ground to a suitable particle size, and then water is added until the moisture content is approximately twenty percent. Thereafter, the pipe must be dried, and the excess water must be removed from the clay before the pipe can be fired for the purpose of vitrifying it, since otherwise the water would form steam and destroy the pipe. The drying process takes anywhere from twelve hours to four weeks.

An object of this invention is to provide a new and novel means for manufacturing vitrified clay pipe.

Another object of this invention is the provision of means for manufacturing clay pipe which is faster than presently known methods and which lends itself to continuous automatic production processes.

Still another object of the present invention is the provision of means for manufacturing vitrified clay pipe which is more efficient than presently known means.

Yet another object of the present invention is the provision of means for manufacturing clay pipe which is more economical than presently known means.

Still another object of the present invention is a unique means for manufacturing clay pipe which is of better quality than the clay pipe presently being manufactured.

These and other objects of the present invention are achieved in an arrangement wherein, after the clay has been ground to a suitable particle size, without any additional water being added, the clay, which at this time contains only between five and ten percent moisture, is fed into a novel compression chamber. There it is compressed into a desired shape, which is established in the space between a mandrel or arbor and an elastomeric compression cylinder. The elastomeric compression cylinder is hydraulically compressed by external fluid pressures. Thereafter, the formed pipe is removed from the compression cylinder, its ends are properly trimmed, and it is directly transported to the kiln for firing. The small amount of moisture present is removed without the use of extensive drying facilities now needed. It is then fired to vitrification in the manner which is presently employed.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a sectional view of an embodiment of this invention which is employed in the manufacture of vitrified clay pipe;

FIGURE 2 is a view along the lines 2—2 of FIGURE 1, which shows how the clay pipe is held after it is removed from the compression chamber;

FIGURE 5 is a sectional detail showing how the pipe lengths are connected end-to-end.

Figures 3, 4:
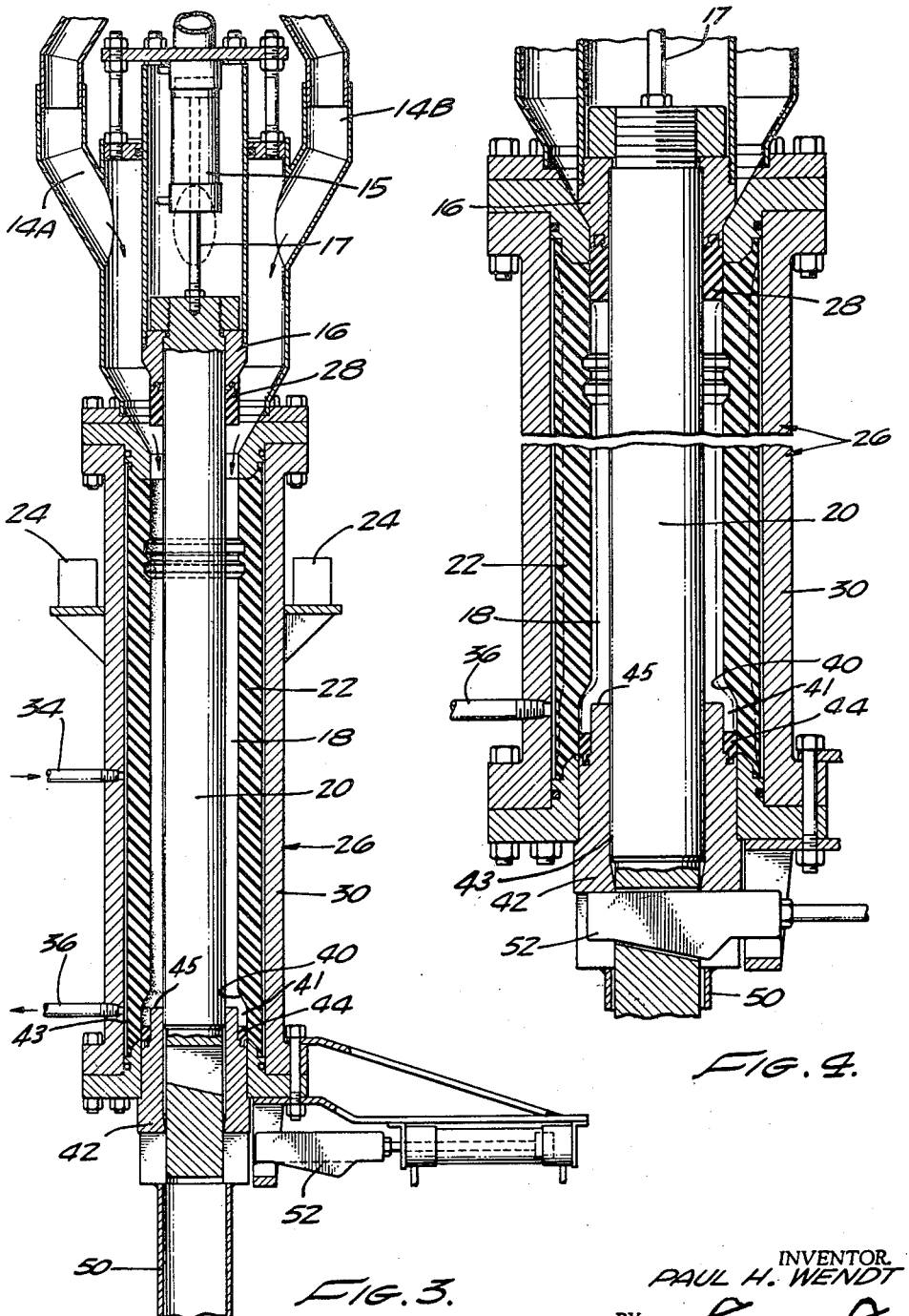
FIGURE 3 is an enlarged view in cross section of the compression chamber illustrating the position of the upper valve when it is desired to charge the compression chamber with clay.
FIGURE 4 is an enlarged cross-sectional view of the compression chamber showing the position of the upper valve when the compression chamber is filled with clay.

Reference is made to FIGURE 1, which is a cross-sectional view of an embodiment of the invention which makes possible the improvement in the method of manufacture of clay pipe. The clay, after being ground to a suitable particle size, does not have water added thereto, as in the presently known practice. Referring to FIGURE 1, the amount of clay required for charging the compression cylinder in accordance with this invention is weighed in a scale 10. Upon the scale indicating the required weight of clay for charging the compression chamber, a hopper-control valve 12 is actuated to permit the clay to fall from the scale and to be directed to the compression chamber through four feed lines, two of which, respectively 14A, 14B, are shown. The passage between the feed lines and the compression chamber are blocked by a feed valve 16.

In the cross-sectional view in FIGURE 4, the enlarged view of the feed valve 16 is shown in position to block the passage of any clay from the feed line into the compression chamber. In the enlarged cross-sectional view of FIGURE 3, the feed valve is shown in the open position, wherein clay may fall from the feed line 14A, 14B into the compression chamber or cavity 18. The feed valve 16 is actuated by a hydraulic actuator 15 which moves a rod 17 attached to the valve 16.

The compression chamber or annular cavity is defined as the space which is established between a mandrel 20 and an elastomeric cylinder or sleeve 22, which surrounds the mandrel. The charge of clay falls into the compression chamber. At this time, the bottom of the compression chamber is closed. During the process of charging the compression chamber, a pair of vibrators 24, which are attached to the structure 26 which supports the compression chamber, are actuated in order to insure that the clay is vibrated down to completely pack the compression chamber.

The feed valve 16 is then closed and, in the process of closing the clay feed lines, it also slides into place an elastomeric ring 28, which closes the end of the compression chamber. Then hydraulic pressure is applied between the inside surface of a metal or solid cylinder 30, which surrounds the elastomeric cylinder 22. The hydraulic pressure is received from a pump 32, which applies the hydraulic fluid to the space between the cylinders by means of an inlet pipe 34, mounted in the wall of the solid cylinder 30, and an outlet pipe 36, also mounted in the wall of the solid cylinder 30. Control of the application and/or release of pressure is permitted by means of control valves 38A, 38B, which are in the pipes connecting the pump 32 to the compression region and are controlled in a well-known manner.

From the enlarged cross-sectional views in FIGURES 3 and 4, it may be seen that the bottom of the compression chamber is closed by structure which can give the end of the clay pipe a bell shape. It may be seen that the inner bottom portion of the elastomeric cylinder 22 flares outward in a region 40, to form a recess 41, whereby the inner and outer diameters of the clay pipe at this region are somewhat enlarged. An end member 42, which is circular, has a central bore 43 which slidably receives the mandrel or arbor 20 and has a rim 45 which extends into the bell-shaped recess 41 for the purpose of enlarging the diameter of the mandrel 20 in this region. It will be readily seen that the end member 42, together with the reduced-thickness portion of the elastomeric cylinder co-operate to provide the bell at the end of the clay pipe. The bottom of the compression chamber 18 is sealed by elastomeric ring 44, which is supported on the end member 42.

The upper portion of the elastomeric sleeve or cylinder 22 is provided with axially spaced, internal annular grooves 21 and 23, and these serve to provide annular ribs 25 and 27 on the finished pipe near the end which is remote from the bell. The space 29 between these ribs 25 and 27 later receives an annular sealing ring 31 of any suitable or desirable cross section, and this sealing ring near one end of the pipe forms a sliding seal within the bell of an adjacent length of pipe.

In order to properly compress the clay to provide a usable clay pipe, it is necessary that the elastomeric cylinder which is employed have sufficient rigidity so that, during the first stage of compression, the variations in density of the clay around the mandrel are ironed out. The wall of the elastomeric cylinder should also be greater in actual thickness than the thickness of the clay to be processed. If a thin or soft diaphragm is used, the outer surface of the clay pipe which is produced will be wavy, and the wall thickness of the pipe will vary in consequence. In other words, the thickness and rigidity and uniform thickness of the elastomeric cylinder should be such that it can compress the pipe to have a uniform thickness and a smooth, outer surface, rather than that the clay should be able to deform the elastomeric cylinder under the influence of hydraulic pressure. The wall of the elastomeric cylinder 22 is thicker than the space between the elastomeric cylinder 22 and the mandrel or arbor 20, or, stated in different terms, the radial thickness of the compression region 18 is less than the radial thickness of the wall of the elastomeric cylinder 22.

A hydraulic pressure is applied from the pump 32 to the space between the rigid and elastomeric cylinders sufficient to compress the clay with which the compression chamber has been loaded to a desired pipe thickness. Pressures may be employed on the order of 3,000 pounds per square inch, by way of example. After an interval long enough to form the clay pipe under the applied pressure, the pressure is removed.

Upon removal of the pressure by way of the exit pipe 36, the bottom of the end member 42 is lowered by means of suitable hydraulically operated elevator mechanism. When pressure is removed from the clay pipe, the pipe exhibits a resilient phenomena. That is, the inner diameter of the clay pipe expands away from the mandrel 20, and thus, without anything further than removal of pressure, the pipe can be very easily lowered by means of the elevator mechanism provided therefor.

As may be seen in FIGURE 1, this elevator mechanism consists of a hydraulic cylinder 46, whose fluid pressures are controlled in well-known manner from a pump 48. A piston 50 may be raised or lowered in accordance with the fluid pumped into the cylinder 46. The piston 50, as may better be seen in FIGURES 3 and 4, supports the end member 42, an extension of which is inserted into the compression chamber to assist in forming the bell end of the clay pipe. FIGURES 3 and 4 also show a hydraulically actuated locking member 52 which, when the end member 42 closes the compression chamber, is inserted into an opening through the end member to assist in holding the member 42 in the proper position and to prevent it from being pushed down under the influence of the hydraulic pressure being applied to the elastomeric cylinder. FIGURE 3 shows the locking member 52 in the open position, and FIGURE 4 shows the locking member 52 in the closed position.

With the locking member 52 is the open position, as shown in FIGURE 3, the piston 50 can be lowered and the pipe, which has now been formed, is withdrawn from the compression chamber. The elastomeric cylinder 22 expands sufficiently, upon release of hydraulic pressure, to permit the annular ribs 25 and 27 to pass freely through its internal opening. When the pipe has been completely withdrawn from the compression chamber, it is handled by apparatus well known in the art. This apparatus comprises a pair of vacuum pipe holders, respectively 56, 58, which may be seen in elevation in FIGURE 2. As may be seen in FIGURE 2, two of these pipe holders 56, 60 are rotatably supported on a common spindle 62. When the vacuum pipe holder 56 is rotated in pipe pickup position, vacuum is applied to a plurality of ports therein from a vacuum pump 68, whereby the vacuum pipe holder is able to hold the pipe 64, which is shown in FIGURE 2, and to carry the pipe thus held over to a kiln car 66. The vacuum pipe holders remove the pipe from the end member, which can then return to close up the compression chamber. The compression chamber can then be charged again with clay to begin the cycle anew.

Indexing mechanism 70 controls the motion of the vacuum pipe holders. This indexing mechanism controls the motion so that, initially, the vacuum pipe holders are swung away from off the elevator past two trimming saws, respectively 72, 74, which properly trim the ends of the pipe. The indexing mechanism then controls the motion of the vacuum pipe holders so that the pipe is rotated 180° to interchange the locations of the bell section and other end section of the pipe. The short-length section of the pipe which has just been cut from the end other than the bell section is trimmed and then placed on the platform of the kiln car 60 underneath the location at which the pipe is lowered. The reason for placing the pipe on its short-length cutaway section is so that when thereafter it is moved into the heated kiln the differential expansion of the clay and the surface of the kiln car is compensated for by the intervening cut-end section.

As pointed out above, the handling of the clay pipe, once it is removed from the compression chamber, is done by apparatus well known in the art and in a manner which is well known. However, since with this invention the clay is formed into pipe which contains moisture only in the region of five to ten percent, rather than twenty percent, the drying time of the clay before it is fired is reduced from a matter of days to a matter of minutes. Furthermore, during the drying of conventional pipe made in the conventional way, the pipe distorts, sometimes violently, and shrinks approximately seven perecnt. Such distortion and shrinkage in drying is almost completely eliminated with the dry-forming process which is employed in accordance with this invention.

Conventional pipe, when fired, shrinks between five to six percent in addition to the shrinkage experienced during drying. Clay pipe made in accordance with this invention shrinks on the order of four percent or less during firing. With lower shrinkage, it is possible to obtain greater dimensional accuracy in the finished pipe, whereby a smaller amount of plastic material necessary for the fabrication of a mechanical joint for pipes is minimized.

Since in the previously known process of forming clay pipe the amount of compaction which the clay receives to form the pipe is a function of the extrusion, there is a limit on such compaction. Since, in accordance with this invention, there is substantially no limit on the amount of compaction to which the clay is subjected in the process of forming it into pipe and since the pipe strength is a direct function of the amount of compaction it receives, it is possible to make a clay pipe having a much thinner wall, but having the same strength as clay pipe made in accordance with the presently known methods, which must have a much thicker wall. Accordingly, a substantial saving in the material required and the weight of the clay pipe is provided. This is important, since clay pipe is normally transported to the locations at which it will be used. The greater the savings in weight, the greater the savings in cost of transportation.

Accordingly, there has been described and shown herein a new and novel apparatus for forming clay pipe which is faster and more economical than presently known methods. The process described herein makes possible a production-line type of clay pipe manufacture by practically eliminating pipe drying time, which was not possible heretofore.

This new and novel apparatus for forming pipe can also be applied to friable granular materials other than clay, such as plastics, cement, aggregate mixtures, and fibrous material.

Having fully described my invention, it is to be understood that I do not wish to be limited to the details herein set forth or to the details illustrated in the drawings, but my invention is of the full scope of the appended claims.

I claim:

1. Apparatus for manufacturing clay pipe from granular clay particles, comprising in combination: an upright mandrel having a cylindrical outer surface, a single integral upright elastomeric sleeve encircling said mandrel and having a cylindrical bore extending for a major portion of its axial length, to define an annular cavity, said sleeve being open at both ends, said major portion of the elastomeric sleeve having a substantially uniform wall thickness which is greater than the thickness of the annular cavity, the lower end of said elastomeric sleeve having an internal recess, an axially movable end member having a central bore for slidable reception of the lower end of said upright mandrel, said end member serving to close the lower end of said annular cavity and having an upper rim projecting into said recess to define an annular enlargement at the lower end of said annular cavity, movable means for closing the upper end of said annular cavity, means for filling said annular cavity with granular clay particles through the upper end of said elastomeric sleeve, hydraulic means for contracting the elastomeric sleeve to compact the clay particles around said mandrel to form a length of molded clay pipe with an integral bell in said annular enlargement, and means for lowering the end member and the molded pipe length downward as a unit out of said annular cavity and away from the mandrel and elastomeric sleeve, upon relaxation of said hydraulic means.

2. Apparatus for manufacturing clay pipe from granular clay particles, comprising in combination: an upright mandrel having a cylindrical outer surface, a single integral upright elastomeric sleeve encircling said mandrel and having a cylindrical bore extending for a major portion of its axial length, to define an annular cavity, said sleeve being open at both ends, said major portion of the elastomeric sleeve having a substantially uniform wall thickness which is greater than the thickness of the annular cavity, the lower end of said elastomeric sleeve having an internal recess, an axially movable end member having a central bore for slidable reception of the lower end of said upright mandrel, said end member serving to close the lower end of said annular cavity and having an upper rim projecting into said recess to define an annular enlargement at the lower end of said annular cavity, means on the upper portion of the mandrel for closing the upper end of said annular cavity, means for moving the mandrel upward to open the upper end of said annular cavity, means for filling said annular cavity with granular clay particles through the upper end of said elastomeric sleeve, hydraulic means for contracting the elastomeric sleeve to compact the clay particles around said mandrel to form a length of molded clay pipe with an integral bell in said annular enlargement, and means for lowering the end member and the molded pipe length downward as a unit out of said annular cavity and away from the mandrel and elastomeric sleeve, upon relaxation of said hydraulic means.

3. Apparatus for manufacturing clay pipe from granular clay particles, comprising in combination: an upright mandrel having a cylindrical outer surface, a single integral upright elastomeric sleeve encircling said mandrel and having a cylindrical bore extending for a major portion of its axial length, to define an annular cavity, said sleeve being open at both ends, said major portion of the elastomeric sleeve having a substantially uniform wall thickness which is greater than the thickness of the annular cavity, the lower end of said elastomeric sleeve having an internal recess, an axially movable end member having a central bore for slidable reception of the lower end of said upright mandrel, said end member serving to close the lower end of said annular cavity and having an upper rim projecting into said recess to define an annular enlargement at the lower end of said annular cavity, movable means for closing the upper end of said annular cavity, means for filling said annular cavity with granular clay particles through the upper end of said elastomeric sleeve, hydraulic means for contracting the elastomeric sleeve to compact the clay particles around said mandrel to form a length of molded clay pipe with an integral bell in said annular enlargement, said elastomeric sleeve having internal grooves near its upper end to form circular ribs on the outer surface of said molded pipe, and means for lowering the end member and the molded pipe length downward as a unit out of said annular cavity and away from the mandrel and elastomeric sleeve, upon relaxation of said hydraulic means.

References Cited by the Examiner

UNITED STATES PATENTS

| | | | |
|---|---|---|---|
| 1,140,785 | 5/15 | Williams | 25—30 |
| 2,152,738 | 4/39 | Jeffery | 264—313 |
| 2,334,509 | 11/43 | Reeves. | |
| 2,624,928 | 1/53 | Long | 264—313 |
| 3,015,855 | 1/62 | Merkel | 264—314 |
| 3,078,539 | 2/63 | Duplessis | 25—120 |
| 3,107,158 | 10/63 | Ahlberg. | |
| 3,126,592 | 3/64 | Taccone | 264—313 |

FOREIGN PATENTS 646,074   8/62   Canada.

J. SPENCER OVERHOLSER, *Primary Examiner.*

MICHAEL V. BRINDISI, WILLIAM J. STEPHENSON,
*Examiners.*